C. A. MORRIS.
EXCAVATING SHOVEL.
APPLICATION FILED APR. 8, 1911.
1,080,292.
Patented Dec. 2, 1913.
2 SHEETS—SHEET 1.
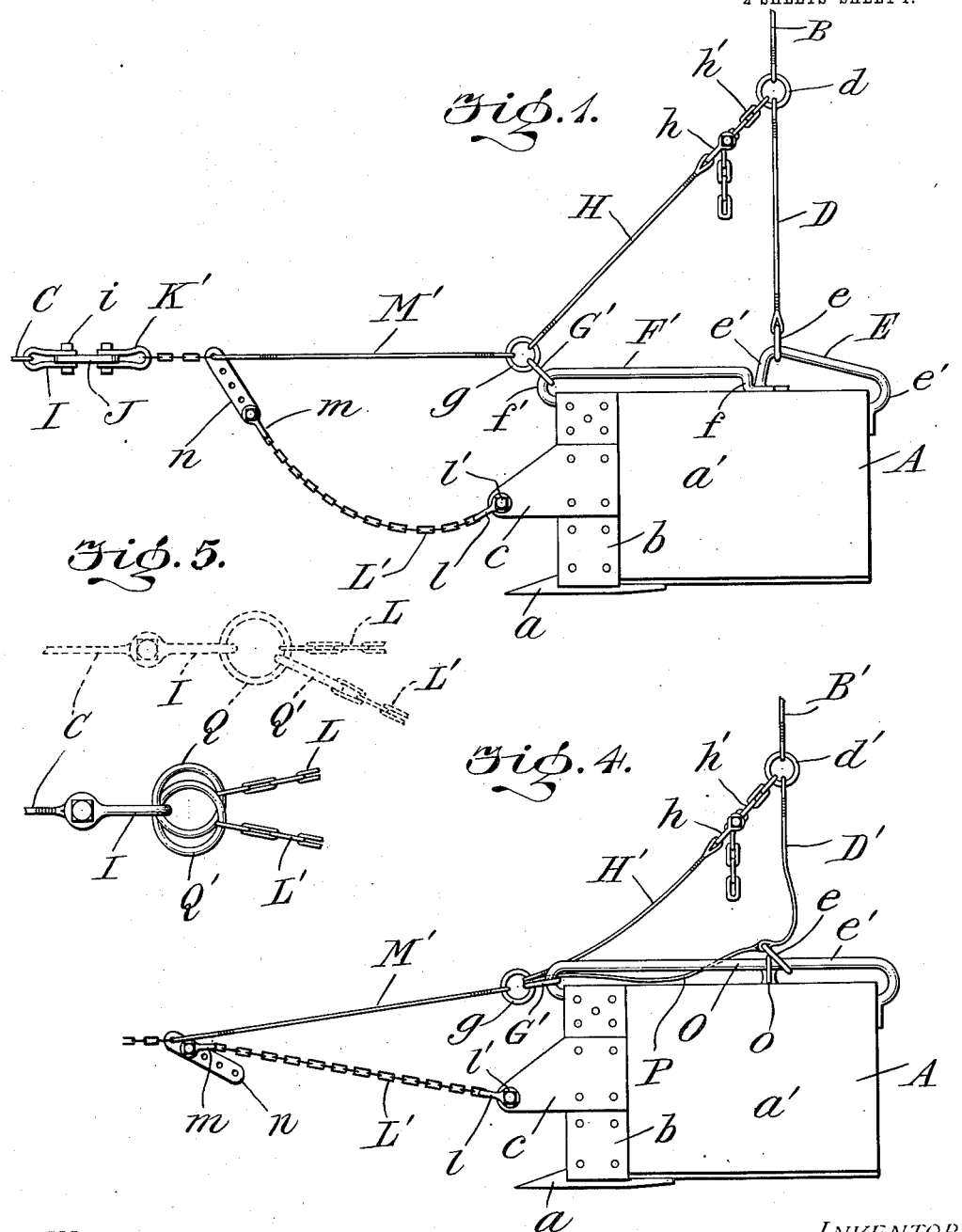
WITNESSES:
INVENTOR
Charles A. Morris
BY
Attorneys

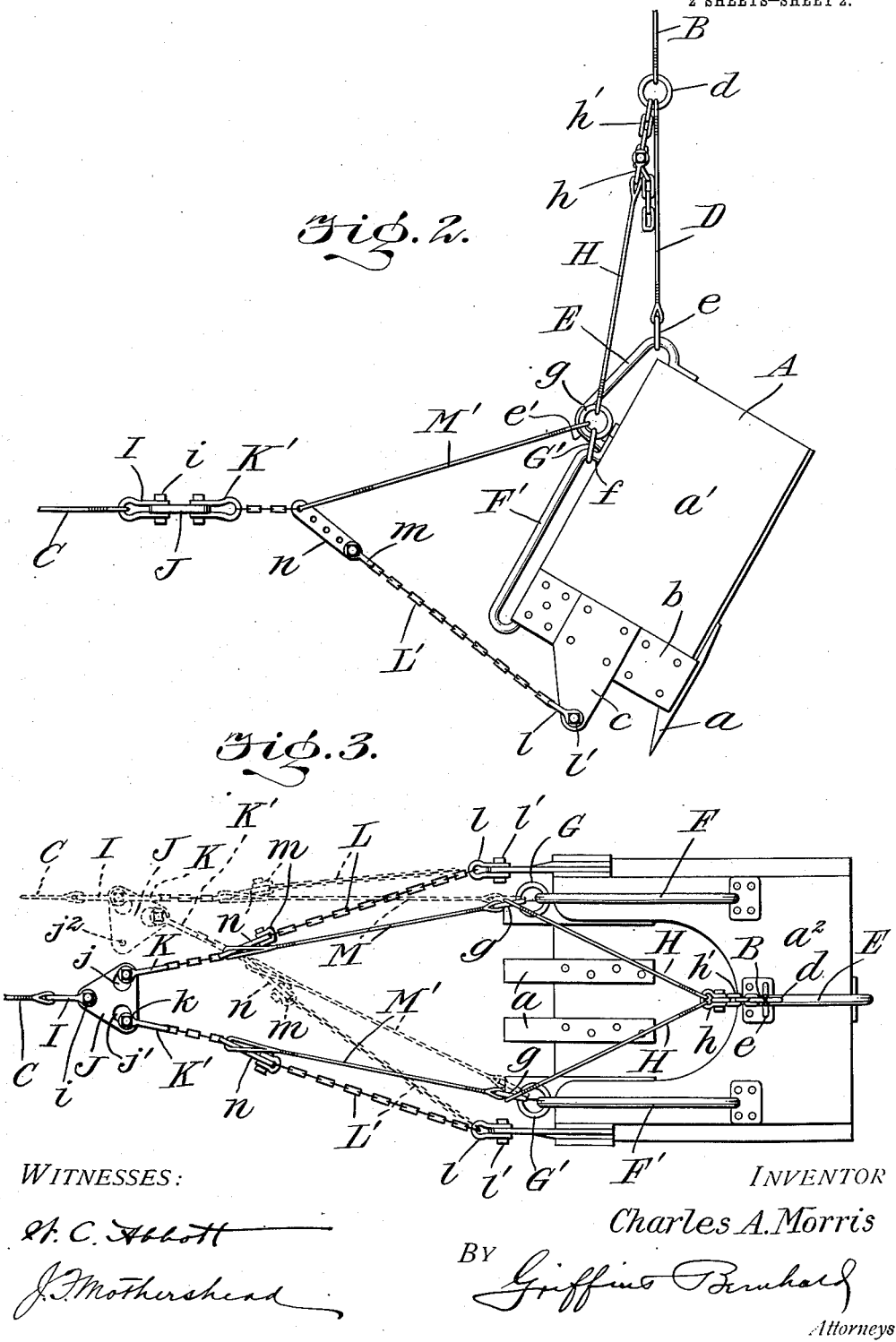

UNITED STATES PATENT OFFICE.

CHARLES A. MORRIS, OF MONTCLAIR, NEW JERSEY, ASSIGNOR TO THE HAYWARD COMPANY, A CORPORATION OF NEW YORK.

EXCAVATING-SHOVEL.

1,080,292. Specification of Letters Patent. Patented Dec. 2, 1913.

Application filed April 8, 1911. Serial No. 619,646.

*To all whom it may concern:*

Be it known that I, CHARLES A. MORRIS, a citizen of the United States, residing in Montclair, county of Essex, and State of New Jersey, have invented a certain new and useful Excavating-Shovel, of which the following is a specification.

This invention is an improvement in means for manipulating or handling shovels, buckets, skips and various other devices.

The invention relates, more particularly, to a means for suspending, loading and unloading devices of the character specified.

Heretofore in the art of excavating it has been the practice to pivot the bail to fixed points on the shovel or other load carrier, on which fixed points the shovel was tiltable for the purposes of loading and unloading. Moreover, in some kinds of shovels now in use, it is a common practice to secure such bail to the sides, and externally of, the shovel. A certain disadvantage results from attaching the bail in the manner specified, to wit, the attaching of the bail exteriorly of the shovel, exposes said bail to contact with various obstacles, whereby the bails are frequently broken off, and, moreover, the binding of said bail against such obstacles greatly increases the power required in loading the shovel.

The present invention overcomes the foregoing and other disadvantages, for the reason that the suspending bail is connected with the shovel intermediate the side walls thereof, thus leaving the side walls entirely free from attachments and precluding rocks, etc., from catching against the shovel. In a shovel of this type, and to secure efficiency in the dumping operation, the suspending bail is connected slidably to the shovel, at the rear thereof, for the purpose of permitting the shovel to assume, practically, a perpendicular position, the result of which is to effectively discharge all the load.

The suspending and controlling devices of my shovel are so arranged that it is not necessary, prior to elevating the shovel, to haul the loaded shovel so far inwardly toward the apparatus, it being the common practice in ordinary excavating operations to haul the loaded shovel from one quarter to a half the distance inwardly toward the apparatus, the result of which is to preclude a direct hoist of the loaded shovel with reference to the sheave of the fall rope. My new devices are characterized by such an arrangement of parts that the loaded shovel may be hoisted, at practically any point, and particularly at a point almost directly below the fall rope sheave, it being necessary to only retain the fall rope slightly inclined between the shovel and the fall rope sheave by maintaining tension on the haul rope, the result of which is to facilitate and expedite the work of hoisting the load.

Another feature of the present invention consists in means by which the bridle, to which the haul rope is attached, may be adjusted so as to regulate the angle at which the shovel enters the ground or the depth of cut.

A further feature of the invention consists in providing the shovel with means whereby the angle of draft may be readily varied, that is to say, the shovel may be hauled from points laterally of its normal position with reference to the haul rope.

Other features of the invention, and the advantages thereof, will appear from the annexed detailed description.

In the accompanying drawings, I have illustrated different practical embodiments of the invention, but the constructions shown therein are to be understood as illustrative, only, and not as defining the limits of the invention.

Figure 1 is a side elevation of an excavating shovel embodying the invention, said shovel being shown in the position which it assumes when loaded and suspended. Fig. 2 is a side elevation of the shovel in a dumping position. Fig. 3 is a plan view of the shovel, the dotted lines illustrating an adjustment of the parts when the shovel is drawn forward by the draft mechanism positioned at one side of a central line through the shovel, whereby said shovel is adapted for scraping or cutting into the soil on a line at an angle to the line of draft through the draft cable. Fig. 4 is a side elevation of another embodiment of the invention. Fig. 5 is a plan view of another form of draft rigging by which a side draft may be exerted upon either side of the shovel.

In order that others skilled in the art may understand the invention, I have elected to show the load carrier in the form of an excavating shovel A, the body of which is similar in construction to some of the prior types of excavating shovels. Said body A is open at the front, closed at the rear, and provided at its front with digging teeth or toes *a*. Side walls *a'* of the shovel are provided with reinforcement plates *b* at their forward edges, said plates *b* being provided with draft lugs *c* which may be integral with the plates, although the draft lugs are shown as being attached firmly to the plates. The draft lugs extend forwardly from the open front end of the shovel.

B indicates a fall rope, and C a haul rope. As shown, the fall rope is provided with a ring or eye *d* to which is connected a suspending member D, said member being either a cable or a chain, as may be preferred.

Instead of employing a bail or a bridle for suspending the shovel from fall rope B, and attaching said bail or bridle to the respective side walls of the shovel, externally thereof, I employ a single suspending member which is connected slidably to the shovel at the rear part thereof. The slidable or running connection between the shovel and the suspending member is secured by the employment of a track bar E and a ring or eye *e* attached to the suspending member D, said ring or eye being free to move upon the track bar. The track bar is composed of a rigid piece of metal bent at its respective ends to produce short arms *e'*. Said track bar is positioned above the rear part of the shovel, substantially midway between the side walls thereof, said track bar being inclined downwardly toward the rear of the shovel. It is preferred to provide a top plate $a^2$ upon the shovel, said top plate having a recess $a^3$, as shown more clearly in Fig. 3. The track bar E is positioned over this top plate $a^2$, the front arm *e'* of said track bar being attached rigidly to the top plate of the shovel and the rear arm *e'* being securely fastened to the back wall which closes the rear of the shovel. When the shovel is loaded and lifted to a position clear of the ground, the ring *e* of the suspending member engages with the forward part of the track bar, as shown in Fig. 1. The suspending member is connected with the shovel rearwardly of the center of gravity of said shovel, but the attachment of the suspending member to the shovel is shiftable, by reason of the ring *e* sliding upon the track bar, so that when tension on the haul cable is relaxed the ring *e* will slide rearwardly upon the track bar in order that the shovel may drop or tilt to an inclined position, shown in Fig. 2, as will hereinafter more fully appear.

F, F', designate track bars positioned at or close to the respective side walls of the shovel, said track bars being above the body of the shovel, and preferably, within the side walls thereof. Each track bar is shown as composed of a single piece of metal bent at its rear end to form an arm *f* which is attached firmly to the top plate $a^2$ of the shovel. The forward end portion of each track bar, F, F', is bent into a loop *f'*, the free end of which is attached rigidly to the forward part of the shovel. The track bars F, F' are parallel to each other, and they extend from the front part of the shovel well to the rear thereof, the rear portions of said track bars being shown as terminating on the line of the forward part of track bar E, although the particular arrangement is not essential.

G, G' designate sliding members fitted to track bars F, F' for sliding movement thereon. Said sliding members are represented as rings or eyes loosely embracing the tracks F, F', and to these sliding rings or members are loosely connected other rings or eyes *g*.

H designates a dumping bridle or bail, the same being composed of cables or chains, the lower forward ends of the cables or chains being loosely attached to rings *g*, whereby the dumping bail or bridle is operatively connected with the slidable members G, G' on the forward tracks F, F'. The upper end portions of the links or chains composing the dumping bridle are connected to a shackle *h* which is adapted to be adjustably connected to any one link of a short chain *h'*, which is attached to the ring or eye *e* of the fall rope. The suspending member D and the dumping bail or bridle coöperate in suspending the shovel when it shall have been loaded and lifted, said shovel being suspended at three points, all of which are shiftable relative to the shovel. One point of suspension consists of member D and track E, and the two remaining points of suspension are the members of the bridle H and tracks F, F'.

The haul cable is provided with a shackle I having a bolt *i*, and to said bolt of the shackle there is secured a draft plate J. Said plate is shown in Fig. 3 as being substantially triangular in form, although the particular shape of the plate is not essential. The plate is provided near two of its corners with slots *j*, *j'*, and near its other corner with an aperture $j^2$, whereby the plate is adapted to be shifted with relation to the haul rope. K, K' designate other shackles each connected by a bolt *k* to the draft plate J. The bolt *k* of shackle K passes through the aperture *j* of the plate, and, similarly, the bolt *k* of shackle K' passes through the aperture *j'* of said draft plate, the two shackles being separately and pivotally attached to the draft plate. When the pull of the haul cable is to be exerted centrally on the shovel, the bolt *i* of shackle I passes through aperture $j^2$ of the draft plate, as shown in full lines in Fig. 3, but should it be desired to exert a side draft on the shovel, the shackle I of the haul cable should be fitted in one of the apertures *j* or *j'* of the draft plate. The dotted lines in Fig. 3 illustrate the bolt *i* of draft rope shackle I occupying the same slot *j* of the draft plate as the bolt of shackle K, whereby the draft rigging is shifted over to the right of the shovel, but it is evident that the bolt of shackle I may be fitted in the aperture *j'* of the draft plate so that the haul cable is attached closer to the shackle K', thus making provision for exerting a pull upon the left side of the shovel.

Between the haul cable C and the forward part of the shovel are two draft bridles, one of said draft bridles being connected with arms *c* of the shovel and the other draft bridle being slidably connected with the forward part of the shovel by the sliding members G, G'. One draft bridle consists of ropes or chains L, L', provided at their rear ends with shackles *l* attached by bolts *l'* loosely to the draft arms *c* of the shovel, the forward ends of said chains or cables L, L' being connected separately to the shackles K, K'. The other draft bridle consists of cables or chains M, M', the same converging toward the draft plate. The chains or cables M, M' of the draft bridle are connected loosely to the rings by which the suspending bridle H is connected to slidable members G, G', whereby the draft bridle M, M' coöperates with the suspending bridle in retaining a loaded and suspended shovel in a nondumping position when tension is maintained on the haul rope D. The legs of draft bridle M, M' are connected to the perforated plates *n* of draft bridle L, L'. It will be understood that each leg of the draft bridle L, L' is provided with a shackle *m* adjustably connected to one perforated plate *n*, and that the members of the bridle L, L' are adjustable relative to the bridle M, M' and the shovel, for the purpose of securing such a relative adjustment between the two draft bridles as will result in varying the inclination of the shovel, as is desirable.

The operation is as follows:—With the draft rigging adjusted in the position shown in Figs. 1 and 2 and in full lines in Fig. 3, the shovel is adapted to be dropped upon the ground by slackening upon the fall rope and the haul rope, the suspending member, the draft bridles and the dumping bridles being loose or slackened. To load the shovel, tension is placed upon the haul rope, the pull of which draws the bridle M, M', slidable members G, G' and the suspending bridle toward the front of the shovel, and at the same time draws the draft bridle L, L' taut. The main draft of the haul cable is transmitted to the shovel through the draft bridle L, L', but some of the draft comes, also, upon the bridle M, M'. The forward movement of the shovel under the pull of the haul rope moves said shovel over the ground in a manner to load the material into the shovel, the fall rope being slackened to permit the free forward movement of the shovel under the pull of the haul rope. To elevate the shovel subsequent to the loading thereof, tension is placed upon the fall rope, and at the same time tension is kept upon the haul rope. When the shovel is lifted above, and out of contact with, the ground, the ring *e* of the suspending member D is at the forward end of track E and the tension upon the haul rope is applied, mainly, to the bridle M, M', the tension of said haul rope drawing the slidable members G, G' toward the front ends of tracks F, F' so that the main draft bridle L, L' is comparatively slack. The position of the several parts when the shovel is suspended is shown in Fig. 1, by reference to which it will be seen that member D and bridle H act to suspend the shovel from the fall rope B. The shovel is suspended at three points, and so long as tension is kept upon the haul rope C, the bridle M, M' and bridle H are precluded from sliding upon tracks, F, F', thus retaining the shovel in the nondumping position while suspended from the fall rope.

A loaded shovel may be swung from a boom or transported by the movement of a carrier so as to position the loaded shovel over a car, bank or any other place where the excised material is to deposited. To dump the loaded shovel, it is necessary to slacken the fall rope, thus relieving the tension on the bridle M, M'. When the haul rope is slackened, members G, G' slide upon tracks F, F' toward the rear, thus drawing bridle M, M' toward bridle H and the suspending member, whereupon the shovel tilts to an inclined position, said shovel moving in a downward and forward direction with relation to the suspending member D, the ring *e* of said suspending member D sliding upon track E during the downward and forward movement of the shovel to the dumping position. When the suspended shovel is tilted to the dumping position, it is necessary to drop the shovel into contact with the ground or with any other place where the material is to be excavated or the shovel to be loaded, and to draw upon the haul rope so that the bridle M, M', the members G, G' and the bridle H will be moved to the position of Fig. 1 before the loaded shovel can be again raised.

My construction provides a means by which the shovel may be adjusted to a position to dig into the ground, or the shovel may be adjusted to scrape along the ground in order to act upon the " floor " of the excavation, that is, to level off the surface of the excavation. When the shovel is to be adjusted for digging purposes, the angle of inclination of the shovel to the surface of the ground should be increased as compared with the position to be assumed by a shovel when scraping the surface. The shovel is adapted to be tilted to an inclined digging position by adjusting the members of bridle L, L' with relation to the perforated plates n so as to result in a change of the relation of the two draft bridles, whereby the operative length of the bridle L, L' can be increased or diminished with reference to the front end of the shovel and to the draft bridle M, M'. It is obvious that by adjusting the shackles m in the plates n toward the draft plate J, the bridle L, L' will be shortened, but by moving the shackles m toward the other ends of plates n, the bridle L, L' will be lengthened, the effect of which is to cause bridle M, M' to pull upon the shovel and move it to an inclined position for the toes a to dig into the soil. When the shackles m are moved toward plate J, the bridle M, M' will be lengthened, and thus the shovel will assume a slightly inclined position, in order to scrape the ground when hauled forward by the rope C.

It frequently happens that the shovel must be drawn in a forward direction and at an angle to the line of pull of the haul cable, for the purpose of excavating along the sides of the cut. The employment of draft plate J provides means for changing the relation of the draft rigging to the shovel so that a side draft may be exerted upon the shovel by the haul cable, whereby the shovel is adapted to travel in a path at an angle to the line of pull of the haul cable. Assuming the shovel is to travel in a path to the left of the line of pull, shackle I is disconnected from the aperture $j^2$ of the plate J and bolt i of said shackle I is placed in the aperture j of the plate, as shown in dotted lines in Fig. 3. This adjustment of shackle I relative to plate J has the effect of lengthening the legs L', M' and of shortening the legs L, M of the two draft bridles, whereby the line of pull of cable C will be exerted more directly upon the legs L, M than upon the legs L', M' of the draft bridles, the effect of which is to shift the relation of the draft rigging between the shovel and the haul cable, the parts assuming the dotted line position of Fig. 3. The pull of the haul cable draws the shovel forward in a straight line with relation to the cut and in a path at an angle to the direction of the haul cable. This change in the relation of the draft rigging to the shovel is effected independently of the angular adjustment of the shovel by shortening or lengthening the draft bridle M, M' relative to the draft bridle L, L' and the forward part of the shovel. Furthermore, the change in the relation of the draft rigging to exert a pull on either side of the shovel, or to incline the shovel more or less to the surface of the ground, does not in any way affect or impair the efficiency of the means for suspending the shovel or for controlling the dumping of the shovel.

In Fig. 4 of the drawings there is shown another embodiment of the invention wherein the tracks E, F, F' are combined instead of employing a rear track E separate from two independent side tracks F, F'. The shovel is provided at its upper part with tracks O, the end portions of which are secured to the forward and rear parts of the shovel. Each track O is a single continuous bar secured firmly to the shovel above the same, and within a side wall thereof. Each bar O is supported intermediate its ends by a plate o fixed firmly to the shovel, said plate o serving the purpose of a stop for limiting the sliding movement of rings which are adapted to slide upon the track bar. The fall rope B' is provided with a ring d' to which are connected two members D' forming a bridle or bail for suspending the shovel, only one of said members D' being shown. Each member D' is provided with a ring e' fitted slidably upon the rear part of one bar O, said ring e' being shiftable upon the bar O between stop plate o and the rear end of the bar, said stop plate o limiting the forward movement of ring e' on one leg of the suspended bail or bridle. A chain h' is connected to ring d' so as to receive the shackle h of the controlling bridle H', the legs of said controlling bridle being connected to a ring g, each of which rings is connected to a sliding member G or G', said member G or G' being adapted to slide upon the bar O forwardly of stop o. The haul rope C is associated with the draft bridles M, M', L, L' as hereinbefore described. The operation of this form of shovel and its suspending, hauling and controlling means is similar to the structure disclosed in Figs. 1 to 3, inclusive, and need not be here repeated. The cable P is employed between the ring e' and the slidable member G or G' at each side of the shovel, shown in Fig. 4, so that the flexible connections P will retain the rings e', G, G' in proper operative relation to each other during the operation of the shovel.

From the foregoing description taken in connection with the drawings, it will be noted that the suspending means, the controlling bridle H, and draft bridle M, M' are all connected to the shovel at the upper part thereof and between the side walls of said shovel. This organization of devices leaves the side walls of the shovel free and unobstructed by the means employed to connect the suspending and controlling bridles to the shovel, as a result of which the shovel may be drawn through the soil and past rocks and boulders without striking them, the material operated upon not affecting the connections between the shovel and its controlling and operating means. Furthermore, the front end of the shovel is open for the free discharge of the material when said shovel is swung to a dumping position. By maintaining tension upon the haul rope, the shovel is kept under the control of the operator, thus precluding the shovel from swinging free and loosely during the operations of elevating, transporting and dumping the load.

An important feature of the invention consists in the employment of suspending means connected slidably to the shovel and rearwardly of the center of gravity thereof, whereby the shovel is adapted to slide forwardly with reference to a suspending means during the operation of dumping the shovel, thus permitting the shovel to assume such a position that the load will be effectively and thoroughly discharged therefrom.

Another advantage of the invention is that the shovel may be hoisted more directly from the operating boom or carriage of an elevated cableway, for the reason that it is not necessary to haul the shovel to a point directly below the free end of the boom, or below the carriage of the cableway before said shovel can be hoisted so as to suspend the same.

Although I have shown and described the invention as embodied in an excavating shovel, it is not desired to confine the invention to a shovel for excavating purposes, for the reason that the means for slidably connecting the shovel to a fall rope and for controlling the position of the shovel by the tension of a haul rope may be used in connection with different forms of load carriers, such as a hoisting bucket, a skip, a sling, etc.

It will be observed, further, that controlling bridle H may be lengthened or shortened between rings G, G' and the suspending ring d by moving the shackle h into one of the other of the links composing the chain h'. By decreasing the operative length of the bridle H the shovel will not tilt to a dumping position so easily as when a bridle of increased length is employed, but the adjustable bridle is desirable in order to, in a measure, regulate the dumping operation of the shovel.

In Fig. 5 of the drawing there is shown another form of draft rigging by which the side draft is secured. In lieu of plate J and the shackles K, K', I may use the links or rings Q, Q' to connect the draft bridle L, L' to the draft shackle I. When a central draft is desired on the shovel, shackle I engages with both rings Q, Q', as shown in full lines; an adjustment of shackle I into one link Q, allows the other link Q' and leg L' of the bridle to drop back, the effect of which is to lengthen leg L' of the bridle with reference to leg L, thus bringing the draft to the right, as shown in dotted lines, but when shackle I is adjusted into link Q', leg L is lengthened, thus shifting the draft over to the right of the shovel.

Having thus fully described the invention, what I claim as new, and desire to secure by Letters Patent is:

1. In an excavating device, the combination with a shovel, of a suspending member slidably connected thereto and precluded from sliding forwardly of the center of gravity of the shovel, and a drag line on which tension is maintained for precluding the shovel from dumping during the operation of hoisting it, said shovel being movable bodily into a dumping position by slackening tension on the drag line.

2. In an excavating device, the combination with a shovel, of a suspending member, means for slidably connecting said suspending member to the shovel, said connecting means operating to arrest the slidable movement of the suspending member at a point substantially rearward of the center of gravity of the shovel, a draft member, and means coöperating with the suspending member, the draft member and the shovel for retaining the shovel in a nondumping position when tension is maintained on the draft member.

3. In an excavating device, the combination with a shovel, of a suspending member having slidable connection with said shovel for permitting the shovel to move lengthwise and to turn relative to said suspending member, a drag line, and a controlling member separate from the slidable connection of the suspending member with the shovel, said controlling member being operable by the tension of the drag line to preclude the shovel from sliding relative to the suspending member and by the slack of the drag line to secure the sliding and turning movement of the shovel to a dumping position.

4. In a device of the class described, a shovel, a suspending member slidably connected thereto, and a draft bridle also slidably connected to said shovel.

5. In a device of the class described, a shovel, a suspending member slidably connected thereto, and a draft bridle also slidably connected to said shovel at two points, said suspending member being slidable intermediate the points of connection of the draft bridle.

6. In a device of the class described, a shovel, a suspending member slidably connected thereto, and a draft bridle also slidably connected to said shovel at either side thereof, the suspending member being slidable intermediate the points of connection of the draft bridle thereto.

7. In a device of the class described, a shovel, a suspending member slidably connected thereto, above the body of the shovel, and a draft bridle also slidably connected to the shovel, above the body thereof.

8. In a device of the class described, a shovel, a suspending member slidably connected to the shovel rearwardly of the center of gravity, and a draft bail connected slidably to the shovel forwardly of the slidable connection of the suspending member thereto.

9. In a device of the class described, a shovel, a suspending member slidably connected with the shovel at one side of the center of gravity thereof, and a combined draft and controlling bridle coöperating with the suspending member and slidably connected to the shovel.

10. In a device of the class described, a shovel, a suspending member slidably connected to the shovel, and a combined draft and controlling bridle coöperating with the suspending member and slidably connected to the shovel forwardly of the slidable connection of the suspending member thereto.

11. In a device of the class described, a shovel, a suspending device, means for slidingly connecting the suspending device to said shovel, a controlling bridle, means for slidingly connecting the controlling bridle to the shovel, and a haul rope coöperating with the shovel and with the controlling bridle.

12. In a device of the class described, a shovel, a suspending device, means for slidably connecting the suspending device to the shovel, whereby the suspending device is shiftable relative to the center of gravity of the shovel, a hauling member, and a controlling member connecting said hauling member and the suspension device and having a slidable connection with the shovel.

13. In a device of the class described, a shovel, a suspending device having sliding connection with the shovel rearwardly of the center of gravity thereof, a haul rope, and shovel controlling means slidable relative to the shovel forwardly of the center of gravity thereof, said shovel controlling means being operated by tension upon the haul rope to retain the shovel in a nondumping position.

14. In a device of the class described, a shovel, a suspending device slidably connected to the shovel rearwardly of the center of gravity thereof, a haul rope, and a controlling bridle coöperating with the haul rope, said controlling bridle having sliding connection with the respective sides of the shovel and forwardly of the center of gravity thereof.

15. In a device of the class described, a shovel, a fall rope, a haul rope, a suspending device slidably connected with the shovel rearwardly of the center of gravity thereof, separate tracks on the shovel and at the respective sides thereof, and a controlling bridle coöperating with the fall rope and the haul rope, said controlling bridle having sliding engagement with tracks forwardly of the center of gravity of the shovel.

16. In an excavating apparatus, the combination with a shovel, and a haul rope, of a plurality of draft bridles, and means whereby said draft bridles and haul rope are adapted to exert a side draft or a substantially central draft upon the shovel.

17. In an excavating apparatus, the combination with a shovel, and a haul rope, of draft mechanism for connecting said haul rope with the shovel, said draft mechanism being shiftable for causing the haul rope to exert a side draft or a substantially central draft upon the shovel.

18. In an excavating apparatus, the combination with a shovel, and a haul rope, of a flexible draft rigging for connecting the haul rope with the shovel, said draft rigging embodying members shiftable at will for causing the haul rope to exert a side draft or a substantially central draft upon the shovel, and, also, for varying the angle of inclination at which the shovel is adapted to work in the soil.

19. In a device of the class described, a shovel, a haul rope, a draft member to which the haul rope is attached, and a plurality of draft bridles connected to the shovel, each draft bridle having legs the forward ends of which are connected to the draft member, said draft member being shiftable relative to said draft bridles and to the haul rope for securing a side draft upon the shovel.

20. In a device of the class described, a shovel, a plurality of draft bridles each provided with two legs attached to the respective sides of said shovel, and a draft member connected to the legs of the draft bridles, said draft member being shiftable to a position for exerting through the draft bridles a side draft upon the shovel.

21. In an excavating apparatus, the combination with a shovel, suspending means therefor, and a haul rope, of a plurality of draft bridles independent of the shovel suspending means, and a draft member connecting said bridles to the haul rope, said draft member being shiftable for causing the haul rope to exert through the draft bridles a side draft or a substantially central draft upon the shovel.

22. In a device of the class described, a shovel, a fall rope, a haul rope, suspending means for supporting the shovel rearwardly of the center of gravity thereof, said suspending means being slidably connected to the shovel, a draft bridle intermediate the haul rope and the shovel, a second draft bridle, and a controlling bridle, said second draft bridle and the controlling bridle being slidably connected to the shovel forwardly of the center of gravity thereof.

23. In a device of the class described, a shovel, a suspending bridle slidably connected to the shovel rearwardly of the center of gravity thereof, and a controlling bridle intermediate the haul rope and the suspending bridle, said controlling bridle having slidable engagement with the shovel.

24. In a device of the class described, a shovel, a suspending bridle slidably connected with the shovel rearwardly of the center of gravity thereof, a haul rope, a controlling bridle connected to the haul rope and to the suspending bridle, said controlling bridle having slidable engagement with the shovel forwardly of the center of gravity thereof, and means for varying the operative length of the controlling bridle.

25. In a device of the class described, a shovel, a haul rope, a draft connection to which the haul rope is attached, and a draft bridle composed of legs attached separately to the draft connection and to the respective sides of the shovel, said draft connection being shiftable relatively to the legs of the draft bridle and to the haul rope whereby the line of draft on the shovel may be positioned centrally or to either side of the shovel.

26. In a device of the class described, the combination with a shovel, and a suspending member, of means for effecting a slidable connection between the shovel and the suspending member, the path of said slidable connection being lengthwise of the shovel, means for precluding said connection from sliding forwardly of the center of gravity of said shovel, and a drag line the tension of which precludes the shovel from sliding relative to the suspending member.

In testimony whereof I have signed my name to this specification in the presence of two subscribing witnesses.

CHARLES A. MORRIS.

Witnesses:
H. I. BERNHARD,
J. F. MOTHERSHEAD.